United States Patent [19]

Vidmantas

[11] Patent Number: 4,741,214
[45] Date of Patent: May 3, 1988

[54] CAPACITIVE TRANSDUCER WITH STATIC COMPENSATION

[75] Inventor: Eugene Vidmantas, Rochester, N.Y.

[73] Assignee: Combustion Engineering, Inc., Windsor, Conn.

[21] Appl. No.: 909,761

[22] Filed: Sep. 19, 1986

[51] Int. Cl.$^4$ ............................ G01L 7/08; G01L 9/12
[52] U.S. Cl. ........................................ 73/708; 73/718; 73/724; 361/283
[58] Field of Search ................ 73/708, 718, 724; 361/283

[56] References Cited

U.S. PATENT DOCUMENTS

| | | | |
|---|---|---|---|
| 3,077,561 | 2/1963 | Revesz | 73/708 |
| 3,618,390 | 11/1971 | Frick | 73/718 |
| 3,646,538 | 2/1972 | Frick | 340/200 |
| 3,793,885 | 2/1974 | Frick | 73/718 |
| 3,800,413 | 4/1974 | Frick | 73/718 |
| 3,854,039 | 12/1974 | Serrano | 235/193.5 |
| 3,975,719 | 8/1976 | Frick | 340/200 |
| 4,295,376 | 10/1981 | Bell | 73/724 |
| 4,339,750 | 7/1982 | Delacruz | 340/870.37 |
| 4,458,537 | 7/1984 | Bell | 73/718 |
| 4,562,742 | 1/1986 | Bell | 73/718 |

Primary Examiner—Donald O. Woodiel
Attorney, Agent, or Firm—Chilton, Alix & Van Kirk

[57] ABSTRACT

A capacitive sensor is compensated for changes in the ratio of the capacitances of a pair of capacitors which result from changes in a relatively static background condition such as pressure. The compensation is achieved by providing a shunt capacitance for one of the sensor capacitors, the shunt capacitance being located such that it will not be effected by the background condition.

13 Claims, 4 Drawing Sheets

CAPACITIVE TRANSDUCER WITH STATIC COMPENSATION

BACKGROUND OF THE INVENTION

1. Field of The Invention

The present invention relates to capacitive transducers and particularly to sensors wherein changes in pressure are transduced into a measurable variation in the capacitance ratio of a pair of capacitors. More specifically, this invention is directed to improved methods for measuring pressure differential and especially to methods for compensating measuring devices of the variable capacitance type for changes in dielectric constant and/or mechanical distortion. Accordingly, the general objects of the present invention are to provide novel and improved apparatus and methods of such character.

2. Description of The Prior Art

Sensors wherein a condition being monitored is transformed into a variation in capacitance are well known in the art. While not limited thereto in their utility, such capacitive transducers are particularly well suited for use in monitoring pressure or pressure differences. Examples of prior art capacitive pressure transducers may be seen from U.S. Pat. Nos. 4,295,376, 4,458,537 and 4,562,742.

A class of known capacitive transducers of the "push-pull" type define a pair of capacitors which may utilize a common fluidic dielectric. The capacitors are often concentric and in such case first plates of each capacitor are carried by a diaphragm-like member which will be deflected as the condition being monitored varies. Such deflection will simultaneously change the spacing between the plates of both of the capacitors and thus will change the capacitance thereof. The member on which the movable capacitor plates are supported will, when a pressure differential is to be measured, typically be mounted and driven such that the spacing between the plates of the inner and outer capacitors will vary in opposite directions. The change in the ratio of the capacitance of the two capacitors is measurable electronically and will be commensurate with the change in the pressure differential or other monitored condition.

Previously available transducers of the concentric capacitor type are generally well suited for monitoring the pressure differential between two points in a fluid system such as, for example, a pipe line. However, the previously available devices are known to exhibit variations in the change in the capacitance ratio for reasons other than a change in the condition being monitored. By way of example, a change in the static pressure in a pipe will cause unequal percentage changes in the capacitance of the concentric capacitors. Such unequality will result in the transducer providing an output indicative of a differential pressure change, when in fact the pressure difference has remained the same while the static, i.e., the background, pressure has varied.

SUMMARY OF THE INVENTION

The present invention overcomes the above briefly discussed and other deficiencies and disadvantages of the prior art by providing a novel and improved capacitive transducer which is particularly well suited for use in measuring pressure differentials. The present invention also encompasses a unique technique of providing compensation for changes in the response of capacitive transducers resulting from variations in a background or static condition such as pressure or temperature.

In accordance with the preferred embodiment of the present invention changes in the capacitance ratio of a capacitive transducer, resulting from changes in static pressure or other ambient (background) conditions, are minimized by the addition to the transducer of a shunt capacitance in parallel with one of the variable capacitors. This further capacitor will, in the case of a differential pressure responsive transducer, be located outside of the region which is subject to the influence of the condition which effects the accuracy of the transducer.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENT

Figure 1:
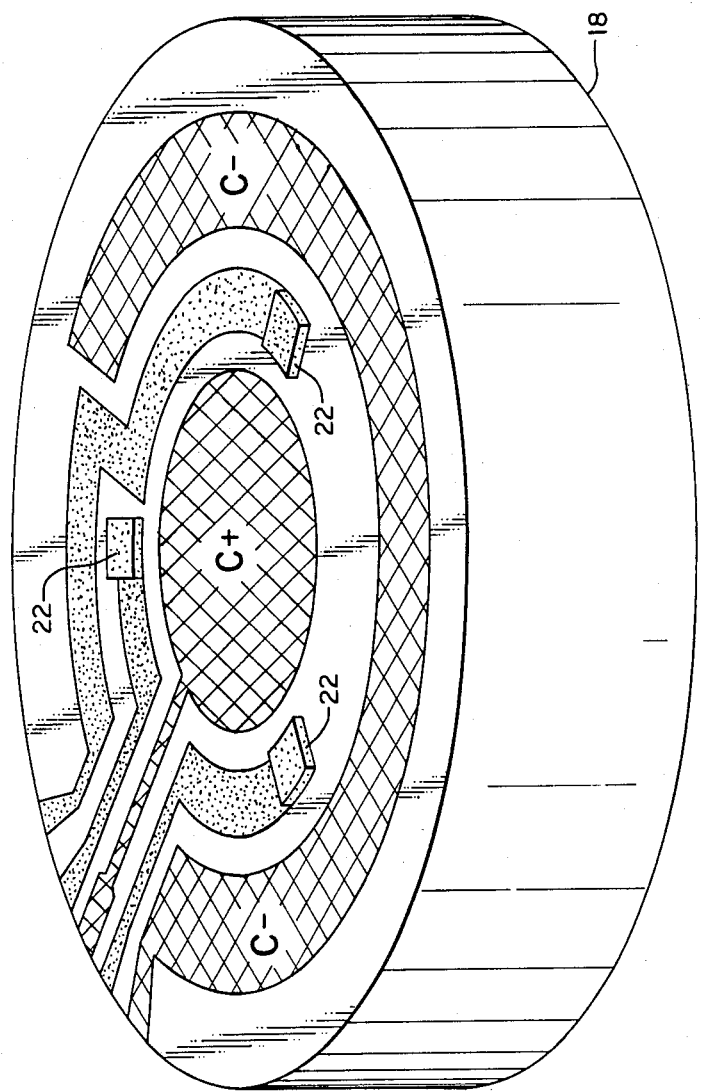
FIG. 1 is an enlarged perspective view of a first member of a concentric capacitor type differential pressure transducer in accordance with the present invention.
Figure 2:
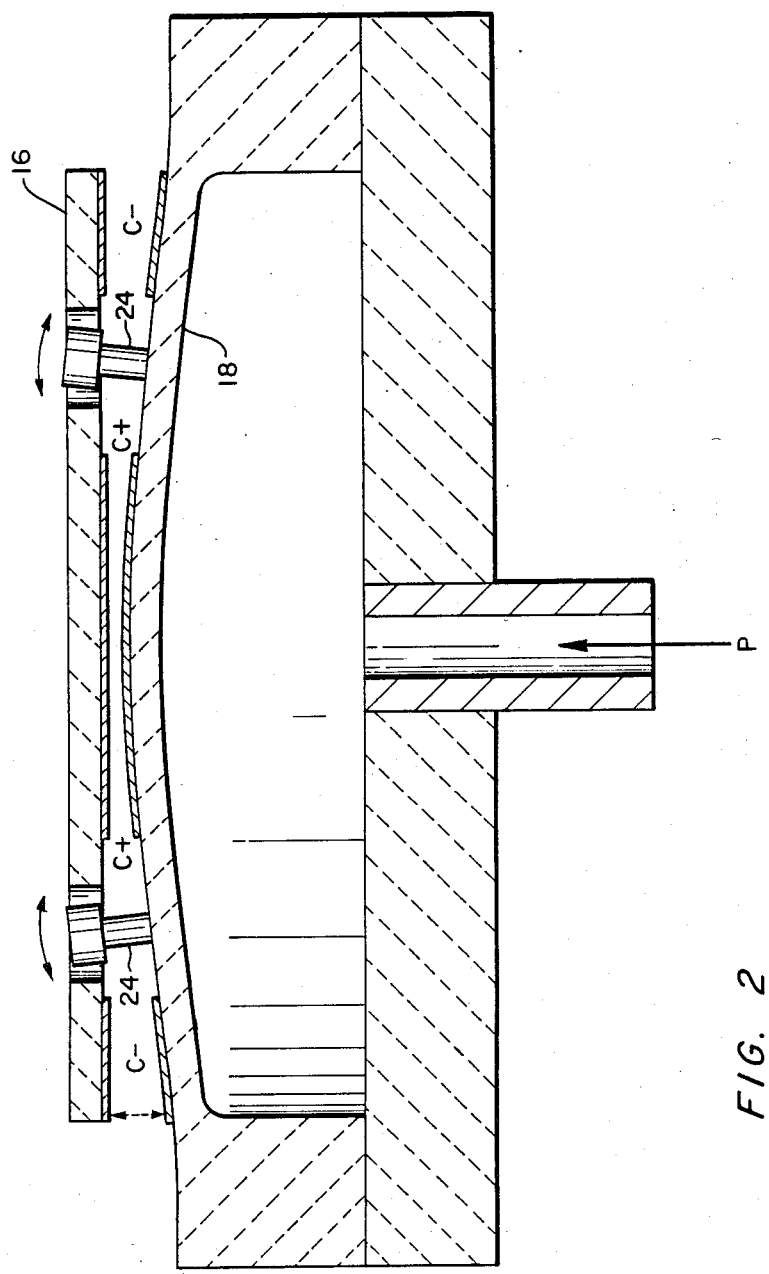
FIG. 2 is a schematic cross-sectional, side elevation view of a portion of a transducer employing the plate of FIG. 1.
Figure 3B:
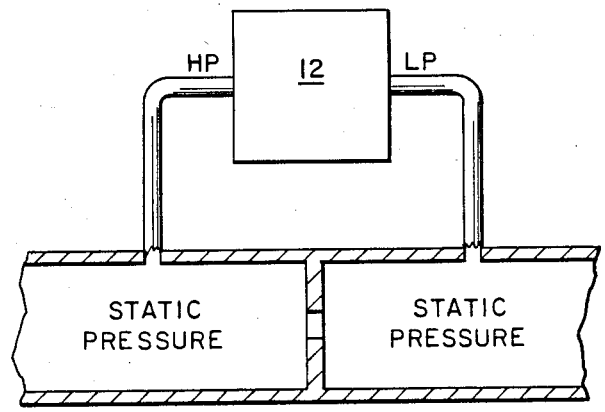
Figure 4:
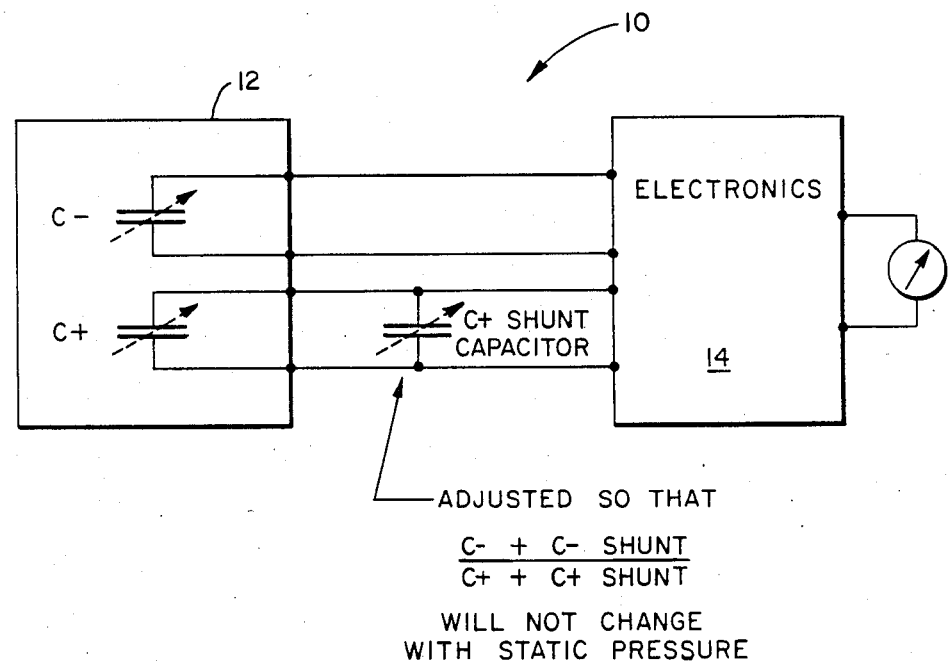
FIG. 4 schematically illustrates the modification of the pressure transducer of FIG. 3 in accordance with the present invention.

With reference now to the drawing, a concentric ring, i.e., a concentric electrode or plate, type capacitive differential pressure measuring device is indicated generally at 10 in FIG. 4. The measuring device 10 includes a sensor unit 12 and the electronics, indicated generally at 14, which is associated therewith. The measuring device also includes, as may best be seen from FIG. 3b, conduits for coupling the sensor unit to the fluid system being monitored. The measuring device further includes conductors for coupling the capacitors of the sensor unit to the electronics and means connected to the electronics for providing an indication of changes in the capacitance ratio. The electronics 14 are well known in the art, may be of the general type shown and described in above-referenced U.S. Pat. No. 4,295,376 and will not be further discussed herein. The sensor unit 12 includes a pair of nonconductive substrates 16, 18. Substrate 16 functions as a reference element. The reference element 16 may, for example, be comprised of a ceramic wafer on which first or upper plates of both capacitors are formed by, for example, thick film technology. The substrate 18, which in the disclosed embodiment supports the lower plates of the capacitors, is shown exaggerated in size in FIG. 1. Referring to FIG. 1, for purposes of explanation the inwardly disposed or central capacitor, the plates of which are in the form of discs, has been labeled C+. The outer, i.e., the concentric ring capacitor, has been labeled C−. A discontinuous guard member, comprised of conductive material, will be disposed between and concentric with the plates of capacitors C+ and C−. The electrode pattern on substrate 16 does not have to be identical to that on the lower substrate 18 as shown in FIG. 1. In the typical implementation, however, electrodes on the two substrates will cooperate to define variable capacitors. Substrate 18 will be flexible, i.e., member 18 will function as a diaphragm, and will typically be comprised of a ceramic. The spacing of substrates 16 and 18, and thus the establishment of a gap between the capacitor plates, is achieved through the use of flexible conductive spacers which are indicated in FIG. 1 at 22. As represented schematically in FIG. 2, torsion arms 24 mounted in the reference element 16 absorb twist and radial deflection of the spacers thereby making sure that the orientation of element 16 does not change during deflection of the diaphragm 18. The equivalent electrical circuit of the sensor unit 12 is represented in FIG. 4 wherein the central capacitor, i.e., the capacitor having the disc shaped electrodes, is again identified as C+ and the concentric ring capacitor is identified as C−. The electronics 14 will monitor, and provide an output signal commensurate with, variations in the capacitance ratio C−/C+. Referring to FIG. 2, which schematically represents the diaphragm 18 in a deflected position (shown exaggerated), it may be seen that a decrease in the spacing between the plates of capacitor C+ will be accompanied by an increase in the spacing between the plates of capacitor C−. Regardless of the composition of the fluid dielectric in the space between the capacitor plates, the changes in the gap between the plates may be measured as a change in the capacitance.

Figure 3A:
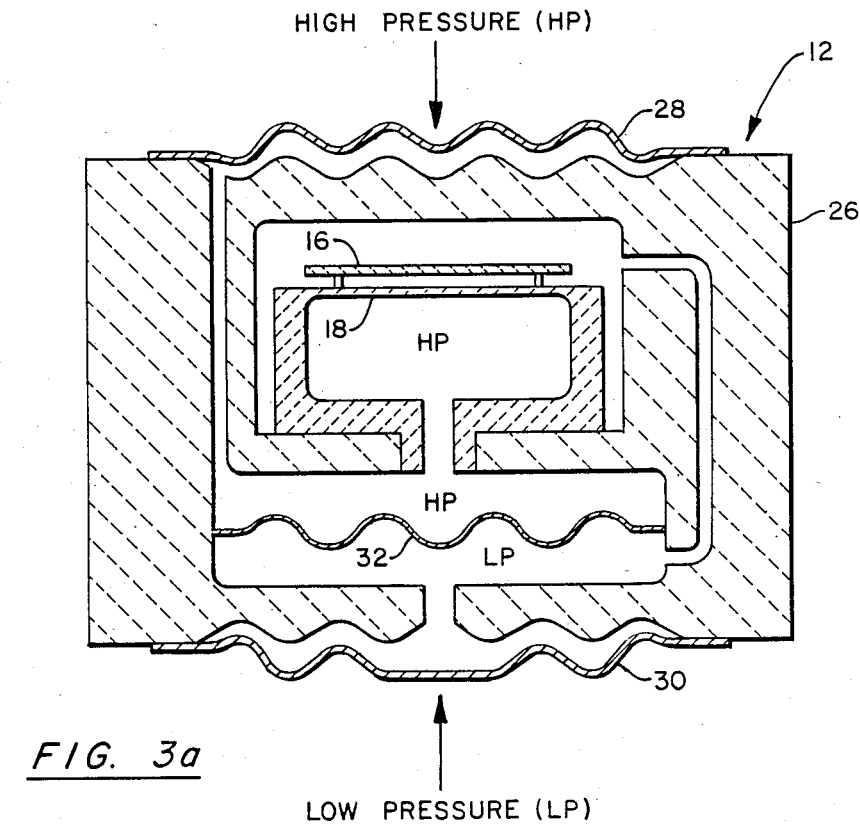
FIGS. 3a and 3b schematically illustrate the manner in which the transducer of FIG. 2 may be employed to measure differential pressure variations.

The sensor 12, as described above, is also commensurate with the state of the art. In accordance with a preferred embodiment of the present invention, in order to hydraulically couple the sensor to the system being monitored, the sensor 12 will be filled with a liquid such as silicone oil. Thus, referring to FIG. 3a, the sensor 12 will typically also include an inner housing 26 which, in combination with a pair of isolation diaphragms 28 and 30, defines an oil-filled subassembly which includes the capacitive transducer unit of FIG. 2. The first or exterior side of the isolation diaphragm 28 is exposed to the "high" pressure side of the system being monitored while the outwardly facing side of the isolation diaphragm 30 is exposed to the "low" pressure side of the system being monitored. This arrangement is schematically depicted in FIG. 3b. Since the isolation diaphragm 28 could touch the convoluted backup member portion of housing 26 in an over-pressure condition, a further "float" diaphragm 32 is provided in a chamber within housing 26. The "float" diaphragm 32 is exposed to the "high" and "low" pressure oil within the sensor 12 and takes up any volume changes resulting from an over-pressure condition thus insuring that the sensor is not over-stressed. As will be obvious to those skilled in the art, any difference in the pressures applied to the outwardly facing or exposed sides of diaphragms 28 and 30 will result in the deflection of diaphragm 18 and thus in a change in the capacitance ratio C−/C+. A sensor as depicted in FIG. 3, accordingly, is well suited for employment in the manner schematically illustrated in FIG. 3b for measurement of low differential pressures with a high common mode static pressure.

Should there be a change in the static pressure in the system being monitored, this pressure being applied to the exposed sides of both of diaphragms 28 and 30, the dielectric constant of the oil within the sensor unit will change. This change in dielectric constant will result in a change in the percent variation of capacitance of capacitors C+ and C− in response to variations in the differential pressure. An unequal variation in percentage capacitance change may also result from pressure induced mechanical distortion. Unequal percentage changes in capacitance introduce a C−/C+ ratio change which will indicate a differential pressure change even though such a differential change has not occurred. The foregoing may be illustrated by the following example which sets forth typical values for a transducer employing a sensor unit of the type depicted in FIG. 3:

TABLE 1

| Static Pressure (PSIG) | C− (PF) | C+ (PF) | % C− Change | % C+ Change | C−/C+ Ratio | % C−/C+ Change |
|---|---|---|---|---|---|---|
| 0 | 60.000 | 60.000 | 0 | 0 | 1.000000 | 0 |
| 2500 | 60.96 | 61.08 | 1.6% | 1.8% | 0.998035 | −0.2% |

The −0.2% change in the capacitance ratio resulting from a change in static pressure would, of course, erroneously indicate a differential pressure change in the system being monitored.

It has been discovered that the change in the dielectric constant of the oils typically employed in sensor units of the type being discussed is linear with increasing pressure in the range of practical concern, i.e., 0–6,000 psi, and that this change is approximately 0.6% per 1,000 psi. This linearity enables compensation to be effected over a range of static pressures. However, it is to be emphasized that the present invention is not applicable only to situations where the dielectric constant in the gap between the capacitor plates varies linearly with pressure. In the case of a non-linear variation, compensation is also possible in the manner to be described below but the correction will be for a particular operating pressure, i.e., the pressure sensor will be configured in the usual manner and then compensation will be affected for a nominal expected static operating pressure.

In accordance with the present invention, as schematically illustrated in FIG. 4, a shunt capacitor is added to the sensor outside of the fluid filled region, the capacitance of the shunt capacitor thus not changing with common mode static pressure. The shunt capacitor will be electrically connected in a parallel with either the C− or C+ capacitor. To provide an example, employing the sensor for which data was set forth above in Table 1, a fixed 5 picofarad capacitor was connected in parallel with capacitor C+. This gave the following:

TABLE 2

| Static Pressure (PSIG) | C− (PF) | C+ (PF) | % C− Change | % C+ Change | C−/C+ Ratio | % C−/C+ Change |
|---|---|---|---|---|---|---|
| 0 | 60.000 | 65.000 | 0 | 0 | 0.923077 | 0 |
| 2500 | 60.960 | 66.080 (61.08 + FIXED 5 PF) | 1.6 | 1.66 | 0.922518 | −0.061% |

As may be seen from the above-tabulated data, the addition of a shunt capacitor having a capacitance which does not vary with static pressure very significantly reduced the change in the C−/C+ ratio with increasing line (static) pressure. While the initial C−/C+ pressure ratio will be different when the present invention is practiced, adjustment for the difference in original ratio may be easily made in the electronics 14.

The present invention is applicable to any capacitive-type sensor device which employs plural capacitors, i.e., the invention is not limited in utility to transducers which operate in the manner described above and shown in FIG. 3. Also, the present invention has utility in providing compensation for temperature induced changes in the percent change in capacitance so long as such temperature induced changes approach linearity.

In practice, a sensor device will typically be formed with shunt capacitance across both the C− and C+ capacitors. After a test at pressure, one of the shunt capacitances will be disconnected, by etching with a laser for example, and the remaining shunt capacitance will then be "tuned" to the appropriate value for the intended application of the sensor.

While a preferred embodiment has been shown and described, various modifications and substitutions may be made thereto without departing from the spirit and scope of the invention. Accordingly, it is to be understood that the present invention has been described by way of illustration and not limitation

What is claimed is:

1. In a capacitive transducer for monitoring a first condition, the transducer including a pair of transducer capacitors, each of said transducer capacitors including a pair of spatially displaced conductors, at least one of the transducer capacitors having a fluidic dielectric medium and having a capacitance which varies with a second condition, the spacing between the electrodes of the said one capacitor varying in response to changes in the monitored condition whereby the ratio of the capacitances of the transducer capacitors will vary as a function of the monitored condition, the improvement comprising:

a shunt capacitor connected in parallel with only the said one of the transducer capacitors that has a fluidic dielectric medium, said shunt capacitor being positioned outside the range of influence of the first and second conditions and being sized to minimize changes in the ratio of the capacitances of the transducer capacitors resulting from changes in said second condition to which the transducer capacitors are exposed.

2. The transducer of claim 1 wherein the condition being monitored is differential pressure in a system and the second condition is static pressure in the system.

3. The transducer of claim 2 wherein both of said transducer capacitors have a fluidic dielectric medium and a capacitance which varies with the second condition and wherein the capacitance of both of the transducer capacitors vary in response to the monitored condition.

4. The transducer of claim 1 wherein first conductors of both transducer capacitors are carried by a first plate member and second conductors of both transducer capacitors are carried by a flexible member, the opposite sides of said flexible member being subjected to the first and second conditions.

5. The transducer of claim 4 wherein the capacitances of the transducer capacitors both vary and in opposite directions.

6. The transducer of claim 5 wherein the first condition being monitored is differential pressure in a system and the second condition is static pressure in the system.

7. The transducer of claim 6 wherein the pressures being sensed to monitor pressure differential are hydraulically coupled to the flexible member.

8. The transducer of claim 6 wherein the transducer capacitors are generally concentric.

9. The transducer of claim 8 wherein the pressure being sensed to monitor pressure differential are hydraulically coupled to the flexible member.

10. A method for compensating a capacitive transducer for the effects of a background condition on dielectric constant, the transducer having a pair of transducer capacitors defined by spatially displaced conductive plates, a fluidic dielectric medium being disposed between the plates of the transducer capacitors, the spacing between the plates of said transducer capacitors varying in response to changes in a monitored condition, said method comprising the step of:

connecting a shunt capacitor in parallel within only one of the transducer capacitors, said shunt capacitor being located in proximity to the transducer and in a position where it will not be subject to the influence of the background condition and the monitored condition.

11. The method of claim 10 further comprising the step of adjusting the size of the shunt capacitor to minimize the difference in capacitance of the transducer capacitors resulting from a change in the background condition of a preselected magnitude.

12. The method of claim 11 wherein the transducer is a differential pressure sensor, the spacing between the plates of the transducer capacitors varies simultaneously and in opposite directions and the background condition is the static pressure in the fluid system wherein a pressure differential is to be measured.

13. A method for pressure compensating a capacitive transducer comprising the steps of:

coupling the opposite sides of the diaphragm of a capacitive transducer to points in a fluidic system between which a pressure differential may be measured, the diaphragm carrying first plates of a pair of variable capacitors, the capacitor first plates being separated from cooperating second plates by a common fluid dielectric, the forces resulting from the static pressure in the fluidic system affecting the relative rate of change of capacitance of the transduceer capacitors;

connecting a shunt capacitance across each of the transducer capacitors;

measuring the ratio of the capacitances of the transducer capacitors;

subjecting the transducer diaphragm to a high static pressure;

measuring the ratio of the capacitances of the transducer capacitors while the diaphragm is subjected to the high static pressure;

disconnecting one of the shunt capacitances; and adjusting the remaining shunt capacitance to a value which minimizes the change in the measured capacitance ratio as a result of an increase in the static pressure.

* * * * *